United States Patent Office 3,310,446
Patented Mar. 21, 1967

3,310,446
METHOD OF MAKING A WATER SOLUBLE PROTEIN CONTAINER
Louis E. Georgevits, Leominster, Mass., assignor to The Borden Company, New York, N.Y., a corporation of New Jersey
No Drawing. Filed June 30, 1961, Ser. No. 120,901
2 Claims. (Cl. 156—198)

This invention relates to a protein composition and film adapted particularly for use in making heat sealed packages for foods and other products.

Films of casein and of vegetable seed proteins have long been used. They have not been heat sealable, however, as into packages. Heat sealing, such as practiced with polyethylene and like plastics, depends upon the plastics melting when hot and solidifying cold. Since the proteins do not melt but decompose at high temperatures, the heat sealing technique has been inoperative with them.

The present invention provides a protein composition such as a film that is heat sealable and also quickly soluble in water.

Briefly stated, the invention comprises a composition including casein, a vegetable seed protein or both, a large proportion of a substantially non-volatile sealing promoter, and an agent for establishing the pH of the composition at a level outside the isoelectric range for the protein and making the selected protein soluble slowly at least in liquid water, cold or hot. The invention comprises also the film and packages made from the composition and the herein described process of making them.

As to the protein, I use, ordinarily, any casein which has been curded from milk by acid and separated from the whey by a usual commercial process. Paracasein, resulting from curding the milk by rennin, is not necessary for the present product or process but may be used if its cost is permissible for a given purpose. Other proteins that can be used are vegetable seed meal proteins, examples of which are the proteins isolated by usual techniques from the meal of soybeans, peanuts and corn.

The pH establishing agent is a water soluble alkali such as sodium or potassium hydroxide, carbonate, metaphosphate, and meta silicate, ammonium hydroxide, borax, and trisodium and tripotassium phosphate. Organic bases although not necessary or economical can be substituted in films not to be used for food or therapy, e.g., mono-, di or triethanol or trimethanol amines, ethylene diamine, tetraethylene pentamine, morpholine, and other water soluble alkyl amines and alkylene polyamines. Representative acids that can be used are lactic, glycolic, hydrochloric, and phosphoric acids.

The heat sealing promoter is a polyhydric alcohol having 2-8 hydroxyl groups. Examples are glycerol; ethylene, propylene, diethylene, and triethylene glycols; sorbitol; and glucose and sucrose, separately or mixed. Particularly satisfactory are mixtures of glycerol and sorbitol in the proportion of about 30-70 parts of glycerol for 100 parts of the mixture.

Additional minor components may be introduced for their several usual effects and in customary proportions as, for instance, a defoamer, a dye if it is desired to establish a color in the film, and a bacteristat or bactericide and a fungistat or fungicide for preventing growth of bacteria or mildew or other fungus. Examples of these minor components to be used are as follows: Defoamer—tributyl citrate, pine oil, and octyl alcohol; bacteristat or bactericide—methyl, ethyl and propyl p-hydroxybenzoates, benzoic acid, and calcium propionate; and fungistat or fungicide—calcium propionate, sodium orthophenyl phenate, and sorbic acid.

When the composition or film constituting the final product of this invention is to be used with a food or drug product, then every component entering into the composition, is to be selected from materials that are non-toxic and approved for such uses.

As to proportions, it is important to have a large amount of the heat sealing promoter. Otherwise the promoter is ineffective for the purpose. Also the large proportion of it makes the finished film quickly soluble in cold water, as in a minute or so and usually about a half minute or less. For these reasons the proportion used is about 50–200 parts of the promoter for 100 parts of protein and for best results in all regards about 75–125 parts of the promoter. If the content of heat sealing promoter is objectionably high, as above the maximum stated, the films will be somewhat stickly. If the amount of promoter is below the lower limit stated, the film edges will not fuse or will crack either during attempted heat sealing or when bent at room or lower temperatures.

The pH establishing agent is used in amount to establish the pH of the water dispersion of the composition at a level outside the isoelectric range, suitably at least 1–1.5 units away from the isoelectric point (pH of minimum solubility for the selected protein) as, for instance, below 3.5 or above 6 and preferably within the range about 1.5–3 or 7–10.

In general the method of making the film is as follows: The selected protein and either the alkali or acid pH establishing agent are dissolved in water to a concentration of protein that may be suitably within the range about 10–30 parts for 100 parts of the whole solution. The water content is about 230–900 parts for 100 parts dry weight of the protein. At the time the solution is being made the said minor components, if any are to be used, are present, e.g., the defoamer to prevent the development and retention of the foam otherwise resulting from the dissolving and stirring of the protein in the water, the bacteria and fungus growth inhibitors, and approved dye colors.

The film is formed by casting the solution onto a flat or rotary support or other surface conventionally used in making cast films. The water is then evaporated to leave a dried, intact film. This film is stripped from the support and, for best results, is conditioned in moist air for several hours. It is then ready to be rolled up for storage or to be cut to size for use.

The concentration of the solution cast as described and the thickness of the layer of the solution determine the thickness of the film after drying.

For heat sealing the edges of the film into a package, that is, the sides of a folded area and eventually the mouth, there is used any conventional heat sealing unit for plastic materials adjusted if necessary to give conditions such as the following: Temperature of about 240° F. and pressure of about 20 lbs./sq. in. on the heated sealing jaws and clamping time about 1 second. Variations from these conditions may be used, depending in part at least upon the exact composition which is being heat sealed. The conditions stated are representative of those that are operative with my composition. A higher temperature and a shorter time, for instance, may be used or a somewhat lower temperature and longer time. If the protein composition being sealed tends to stick to the jaws of the sealing apparatus, the jaws may be lined with aluminum foil to protect the plastic from direct contact with the heated jaws. Casein films, for example, do not adhere objectionably to such foil.

Films may be cast to various thicknesses from my mixed solutions of protein and plasticizer. The thickness of the dried film can be approximately predicted from the cast thickness of the solution. A solution of 25 percent concentration of protein-plasticizer mixture will yield a dry film of thickness approximately one-fourth that of the wet film as cast. Thus, a film of this solution cast by a draw-down bar of 0.006 inch clearance above the support yields a film approximately 0.0015 inch thick when dry.

A film of this thickness is generally suitable for forming into a packaging envelope, say of 6 sq. in. area per side, is strong enough to hold a fraction of an ounce of a dry, low density foodstuff, and is quickly and completely soluble in water. However, to form a larger package, or a stronger one of the same size, thicker film is used as, for instance, of thickness varying from 0.001 to 0.01 inch.

The width of the area on the side edges and of the mouth of the packages that are heat sealed is ordinarily about ¼ inch, but may be wider for the larger packages. Packages made as described dissolve in cold water in times roughly proportional to their thickness. A film of thickness 0.002 inch, for example, will dissolve in cold water in about 20 seconds. The packages show no blocking tendency when stacked at high summer temperatures, as up to 110° F. The films are resistant to damage by freezing and in most cases are not affected appreciably by temperatures below 32° F., particularly if some moisture such as 10 to 20% of the film is present in the film, as for instance the moisture in equilibrium with air at moderate humidities. The films at room temperature are neither brittle nor limp ("ragged") when in equilibrium (equilibrated) with air of relative humidity within the range 15%–85% at 73° F. Films stored in the laboratory air in New York State and observed after 3 months have been found to be in good condition as to freedom from both limpness and brittleness.

The invention will be further illustrated by description in connection with the following specific examples or the practice of it. In these examples and elsewhere herein proportions are expressed as parts by weight.

*Example 1*

A typical formula for film casting follows:

| Component: | Parts by weight |
|---|---|
| Casein (acid curded grade) | 100 |
| Defoamer (tributyl citrate) | 0.1 |
| Sodium hydroxide | 2.6 |
| Glycerol | 25 |
| Sorbitol (70% solution in water) | 50 |
| Propyl p-hydroxybenzoate | 1.5 |
| Methyl p-hydroxybenzoate | 1.5 |
| Water | 422 |

The pH of the solution was 7.5.

The casein is mixed into the water (here at about 60° F.) with agitation, the defoamer added and the resulting slurry held about 10 minutes for soaking. The sodium hydroxide is then admixed, as in a few parts of water. The dispersion (or solution) is heated by steam to 170°–180° F. and held at this temperature with agitation for 10 minutes. The warm dispersion is cooled to about 110°–120° F. The glycerol and sorbitol, as mixed heat sealing promoter, are next added. The dispersion is then passed through an 80-mesh screen and the screened dispersion cooled to room temperature. For best results the dispersion is held overnight before use in making films.

The film is cast to a dried thickness of 0.002 inch, as described above, stripped from the casting surface and transferred to a supporting paper. The film and the paper support are then passed through a conditioning chamber in which they are exposed for several hours as, for instance, at least 4 hours in an atmosphere of relative humidity 50% and at a temperature of 73° F., to equilibrate the film with respect to moisture in the air. The films are then removed from the paper support and rolled up for storage or trimmed to size for making heat sealable packages.

*Example 2*

An acidic casein dispersion is prepared of the formula below.

| Component: | Parts by weight |
|---|---|
| Casein | 100 |
| Defoamer (tributyl citrate) | 0.1 |
| Lactic acid | 5 |
| Sorbitol (70% solution in water) | 75 |
| Benzoic acid (bactericide) | 10 |
| Water | 844 |

The pH of above mix was 3.0.

As compared to alkaline solutions of casein, acid solutions require proportionately more water for proper fluidity for film casting. To obtain the film thickness 0.002 inch, the acidic dispersion is cast to approximately twice the wet thickness of Example 1, i.e., to about 0.012 inch. Otherwise the film making procedure and the package making and sealing are the same as in Example 1.

*Example 3*

To illustrate the preparation of a soluble film from a vegetable protein, the protein precipitated by acid from an alkaline extract of defatted soybeans is used in the following composition and converted to film form by the procedure of Example 1.

| Component: | Parts by weight |
|---|---|
| Soybean protein | 100 |
| Defoamer (tributyl citrate) | 0.1 |
| Sodium hydroxide | 3.0 |
| Glycerol | 50 |
| Sorbitol (70% solution in water) | 50 |
| Ethyl p-hydroxybenozate | 3 |
| Water | 422 |

The resulting pH was 7.5.

*Example 4*

The composition and procedure of Example 3 are varied by replacing the soy protein by an equal weight of the following proteins, used separately and in turn: a clarified grade of isolated peanut meal protein, isolated corn meal protein; and casein modified as described in the following patents issued to The Borden Company: 2,933,406; 2,757,171; 2,293,385, and 2,271,389.

*Example 5*

The procedure and compositions of Example 1 are used except that the heat sealing promoters there used are replaced by an equal weight of any of the other said promoters disclosed herein.

*Example 6*

The composition and procedure of Example 1 are followed except that there is admixed into the solution 0.5 part of any of the fungistats disclosed above.

The films made as described in the above examples and elsewhere herein meet the requirements as to heat sealing properties, rapid rate of solution in water, and flexibility when thin.

*Example 7*

This example illustrates the use of films made as described herein when made into packages, charged with various commercial products and heat sealed as described.

(a) A package measuring on the face 4 x 4 inches, having a thickness of 0.002 inch and made of the formula of Example 1, was charged with 70 grams of soap powder. The package was stored in an atmosphere of 15% relative humidity until the moisture content of the film of packaging material was approximately at equilibrium. The storage did not materially reduce the flexibility or strength of the film. Also a package of the same kind maintained at 85% relative humidity did not soften objectionably. When the package with the soap included was thrown into water at room temperature, the package and the contents dissolved completely in 30 seconds of stirring.

(b) A package of the kind described in paragraph (a) above was filled with 27 grams of "instant" skim milk powder. When thrown into cold water, the whole dissolved completely in 30 seconds of stirring.

(c) The same film in a package 2.5 x 2.5 inches was filled with 8 grams of chocolate powder. When placed in a cup of water at 150° F. and stirred, the package and contents dissolved in 15 seconds.

(d) A film was cast in liquid thickness of 0.006 inch from New Zealand casein (produced by the lactic acid process) and then dried. The composition used contained 100 parts of diethylene glycol plasticizer for 100 parts of casein. The pH establishing agent used to dissolve the casein in the aqueous solution was 5 parts of sodium carbonate for 100 parts of the casein.

The dried film, averaging 0.002 inch in thickness, was made into a rectangular package of face 2 x 4 inches, filled with soap powder, and then heat sealed. The package and contents when thrown into water at 180° F. dissolved in 6 seconds.

(e) A solution of soybean protein in aqueous sodium hydroxide solution containing 60 parts of glycerol for 100 parts of the protein was cast and dried, with film thickness after drying of 0.002 inch. A 5 x 6 inch heat sealed package, made therefrom and containing 32 grams of instant potato flakes, dispersed completely in 1 minute of whipping in a mixture of one cup of boiling water with one cup of cold milk.

(f) A film of casein containing 100 parts of the sealing agent comprising equal parts of glycerol and sorbitol as mixed sealing promoter for 100 parts of casein and having a thickness of 0.007 inch was filled with cooked grains of corn, heat sealed, and the package then deep frozen for one week. After being allowed to thaw at room temperature, it was then immersed in boiling water. The package dissolved completely in 30 seconds.

(g) When dried corn flakes were substituted for potato flakes in the soybean protein package made as described in paragraph (e) above, the package and flakes remained in good condtion in storage for 3 months during which the observations were made. After the 3 months' period, the package and contents were stirred into cold milk. The packaged material dissolved completely in one minute and became a part of the serving of cereal and milk.

It is important to such results that the proportion of the heat sealing promoter be high and the protein of the film be in natural, unhardened condition. The hardening with chemical agents, which has been considered necessary heretofore, is not necessary to prevent breaking on flexing of my film. In fact such toughening or hardening would destroy the combination of properties required for my use, these including the heat sealability and quick solubility in water.

It will be understood that it is intended to cover all changes and modifications of the examples of the invention herein chosen for the purpose of illustration which do not constitute departures from the spirit and scope of the invention.

I claim:
1. The process of making a container which comprises:
   (1) casting a dispersion comprising a water dispersible protein in natural unhardened condition selected from the group consisting of casein and the proteins isolated from the meal of soybeans, peanuts and corn, a water soluble pH establishing agent selected from the group consisting of alkalies and acids in amount to establish the pH of the dispersion at a level outside the isoelectric range for the selected protein, and a water soluble polyhydric alcohol serving as a promoter of heat sealing and being in the proportion of 50–200 parts by weight for about 100 parts of the protein into film form;
   (2) drying the film;
   (3) shaping the film into a container; and
   (4) heat sealing the container on at least one edge thereof at a temperature of softening of the protein in contact with the promoter of heat sealing but below the temperature of substantial decomposition of the protein therein.
2. The process of claim 1, the said temperature being about 240° F.

References Cited by the Examiner

UNITED STATES PATENTS

| | | | |
|---|---|---|---|
| 1,474,502 | 11/1923 | Wright | 106—147 |
| 1,474,503 | 11/1923 | Wright | 106—138 |
| 2,114,985 | 4/1938 | Schuler | 106—147 |
| 2,236,271 | 3/1941 | Kratz | 106—147 |
| 2,233,891 | 3/1941 | Kratz | 106—147 |
| 2,298,269 | 10/1943 | Atwood | 106—147 |
| 2,316,146 | 4/1943 | Adams et al. | 106—147 |
| 2,342,739 | 2/1944 | Kratz | 106—147 |

ALEXANDER H. BRODMERKEL, *Primary Examiner.*

JOSEPH REBOLD, MORRIS LIEBMAN, *Examiners,*

D. J. ARNOLD, *Assistant Examiner.*